US007059420B1

(12) United States Patent
Wei

(10) Patent No.: US 7,059,420 B1
(45) Date of Patent: Jun. 13, 2006

(54) STRUCTURE FOR FASTENING DETACHABLY BLADE WITH HANDLE OF GARDENING IMPLEMENTS

(76) Inventor: Ming-Ching Wei, P.O. Box 453, Taichung (TW)

( * ) Notice: Subject to any disclaimer, the term of this patent is extended or adjusted under 35 U.S.C. 154(b) by 452 days.

(21) Appl. No.: 10/648,222

(22) Filed: Aug. 27, 2003

(51) Int. Cl.
*A01B 1/00* (2006.01)

(52) U.S. Cl. ....................... 172/375; 172/378; 403/379

(58) Field of Classification Search ................ 172/378, 172/381, 371, 375; 16/110.1; 403/109.1, 403/109.8, 109.2, 109.6, 109.3, 324, 325, 403/379.2, 379.5; 7/114, 116; 111/92
See application file for complete search history.

(56) References Cited

U.S. PATENT DOCUMENTS 203,798 A * 5/1878 Turner ........................ 172/375
2,606,050 A * 8/1952 Morris et al. ............... 403/328
5,556,224 A * 9/1996 Niskanen ................. 403/379.2
5,579,848 A * 12/1996 Hsu ........................... 172/378
5,593,196 A * 1/1997 Baum et al. ............... 294/19.1
5,690,181 A * 11/1997 Shu ............................ 172/378
5,799,996 A * 9/1998 Fredrickson ................. 294/51
5,816,633 A * 10/1998 Odom ......................... 294/51
5,871,058 A * 2/1999 Naccarato et al. .......... 172/378
6,412,843 B1 * 7/2002 Burbrink et al. .............. 294/57
6,575,534 B1 * 6/2003 Chen ..................... 297/411.13

* cited by examiner

*Primary Examiner*—Victor Batson
(74) *Attorney, Agent, or Firm*—Alan D. Kamrath; Nikolai & Mersereau, P.A.

(57) ABSTRACT

A gardening implement comprises a structure for fastening detachably a blade with a handle. The blade is provided at a fastening end with a deviation groove. The handle is provided at a fastening end with a fixation seat and a slide block slidably disposed in the fixation seat. The fixation seat is provided with a retaining slot. The slide block is provided with a retaining through hole. The blade is fastened with the handle such that the deviation groove of the blade is engaged with the retaining through hole of the slide block by virtue of the retaining through hole and the retaining slot being eccentric. As the slide block is activated to cause the retaining through hole to be concentric with the retaining slot, the deviation groove of the blade becomes disengaged with the retaining through hole to allow separation of the blade from the handle.

2 Claims, 8 Drawing Sheets

STRUCTURE FOR FASTENING DETACHABLY BLADE WITH HANDLE OF GARDENING IMPLEMENTS

BACKGROUND OF THE INVENTION

1. Field of the Invention

The present invention relates generally to a gardening implement, and more particularly to a fastening structure of blade and handle of the gardening implement.

2. Description of Related Art

As shown in FIGS. 9–12, a gardening implement of the prior art comprises a blade 50 and a handle 52. The blade 50 is provided with a fastening end 51 which is in turn provided with an annular groove 54. The handle 52 is provided in the inner wall of a fastening end thereof with two balls 53. The blade 50 is fastened with the handle 52 in such a way that the balls 53 are retained in the annular groove 54. The blade 50 is unfastened with the handle 52 by turning a sleeve 55 of the fastening end of the handle 52 such that two recesses 56 of the inner wall of the sleeve 55 are corresponding in location to the two balls 53, which are thus allowed to move partially out of the annular groove 54 so as to enable the fastening end 51 of the blade 50 to be pulled out of the fastening end of the handle 52.

It is readily conceivable that the blade 50 can not be securely fastened with the handle 52 by means of the two balls 53 which are retained in the annular groove 54. The retaining effect brought about by the annular groove 54 and the balls 53 is insufficient to hold the blade 50 and the handle 52 together in a fixed state, especially at the time when the prior art gardening implement is at work.

SUMMARY OF THE INVENTION

The primary objective of the present invention is to provide a gardening implement with a structure for fastening securely and detachably a blade with a handle of the gardening implement. The structure is free of the deficiencies of the prior art structure described above. The structure of the present invention comprises a deviation groove disposed in a fastening end of the blade, and a fixation seat disposed at a fastening end of the handle. The fixation seat is provided with a retaining slot for holding the fastening end of the blade in conjunction with a retaining member which is formed of a slide block and a recovery spring. The slide block is provided with a retaining through hole, which is engaged with the deviation groove of the fastening end of the blade at such time when slide block is located at a fastening position. When the slide block is located at an unfastening position, the retaining through hole of the slide block is disengaged with the deviation groove of the fastening end of the blade, thereby enabling the blade to be unfastened with the handle.

The features and the advantages of the present invention will be more readily understood upon a thoughtful deliberation of the following detailed description of the preferred embodiments of the present invention in reference to the accompanying drawings.

DETAILED DESCRIPTION OF THE INVENTION

Figure 1:
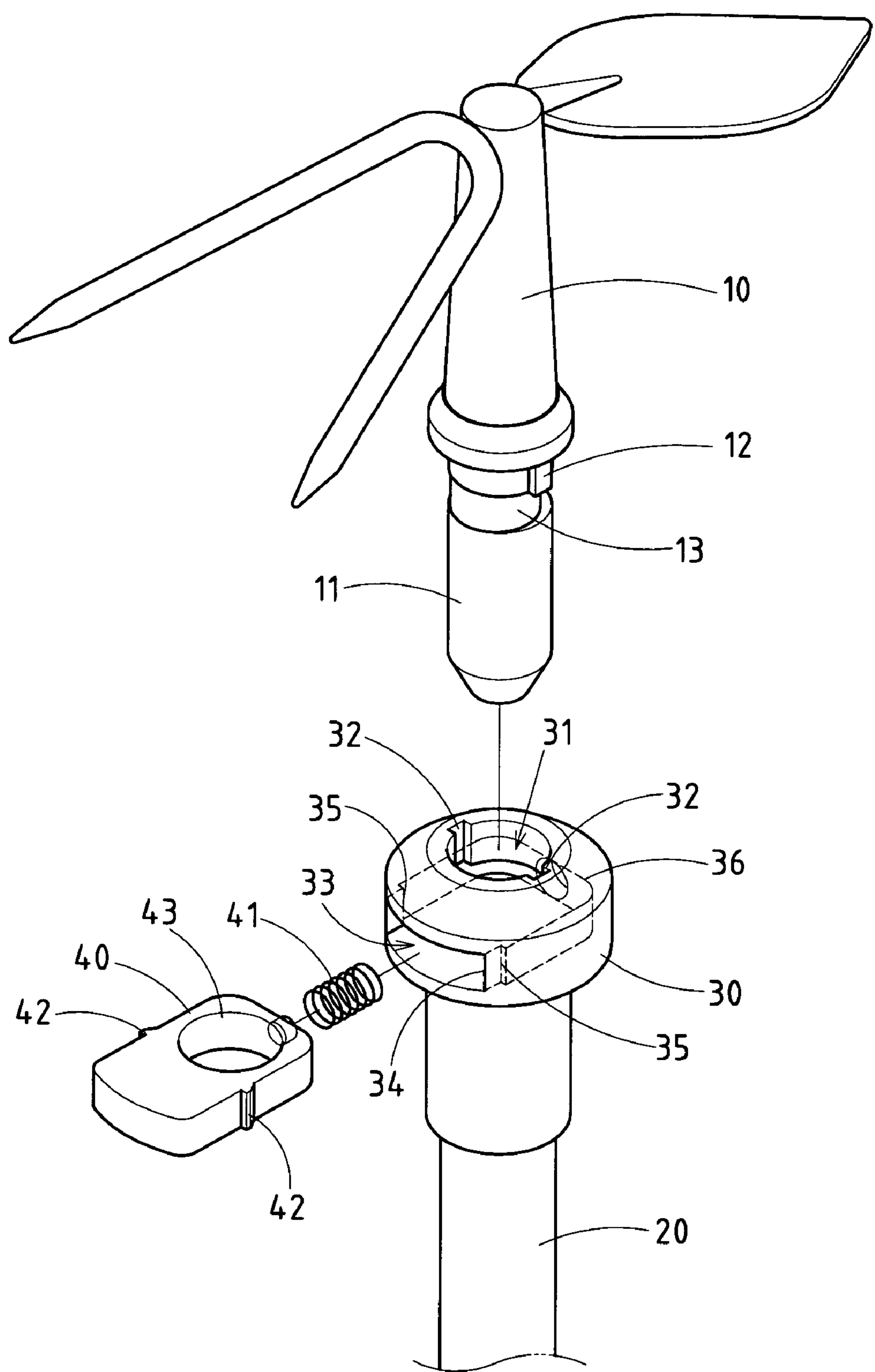
FIG. 1 shows an exploded view of a first preferred embodiment of the present invention.
Figure 2:
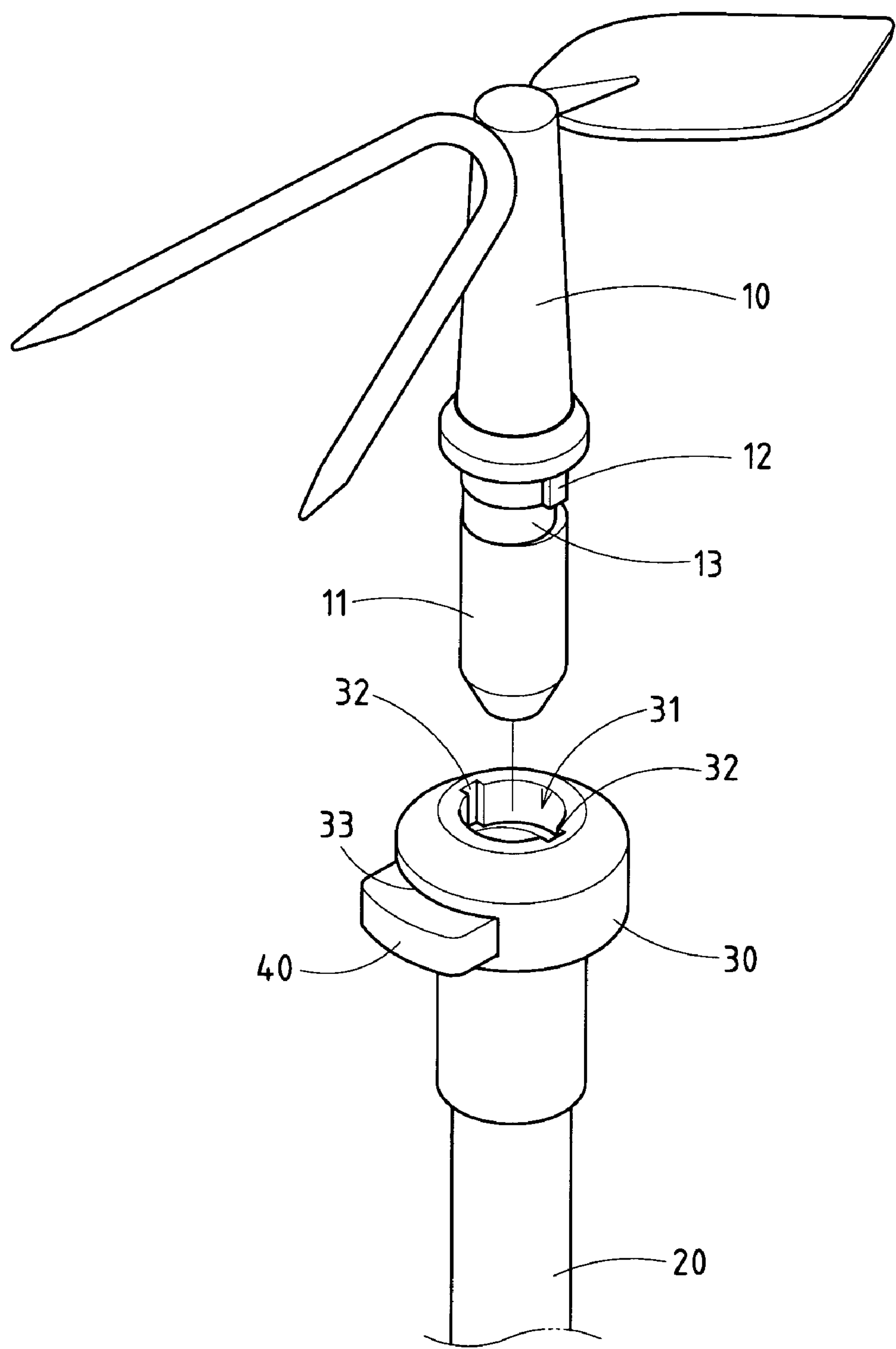
FIG. 2 shows a partial exploded view of the first preferred embodiment of the present invention.

As shown in FIGS. 1–6, a gardening implement embodied in the present invention comprises a blade 10 and a handle 20.

The blade 10 has a fastening end 11 which is provided with two projections 12 and a deviation groove 13 located under the two projections 12.

The handle 20 is provided at a top end with a fixation seat 30 which is in turn provided with a retaining slot 31 and two indentations 32 located in the inner wall of the retaining slot 31 such that they are corresponding in location and dimension to the two projections 12 of the fastening end 11 of the blade 10. It must be noted here that the retaining slot 31 extends in the longitudinal direction of the handle 20. The fixation seat 30 is further provided with a sliding slot 33 perpendicular to and in communication with the retaining slot 31. The sliding slot 33 is intended to accommodate a retaining member which is formed of a slide block 40 and a recovery spring 41. The slide block 40 is slidably disposed in the sliding slot 33 such that an inner end of the slide block 40 is urged by an outer end of the recovery spring 41 whose inner end urges a stop edge 36 of an inner wall of the sliding slot 33. The slide block 40 is provided with two retaining edges 42 opposite to each other and a retaining through hole 43. The slide block 40 is slidably disposed in the sliding slot 33 via an open end 34 of the sliding slot 33 such that the two retaining edges 42 of the slide block 40 are retained in two retaining recesses 35 of the sliding slot 33, as shown in FIG. 4, and that the retaining through hole 43 of the slide block 40 is corresponding in location to the retaining slot 31 of the fixation seat 30.

Figure 3:
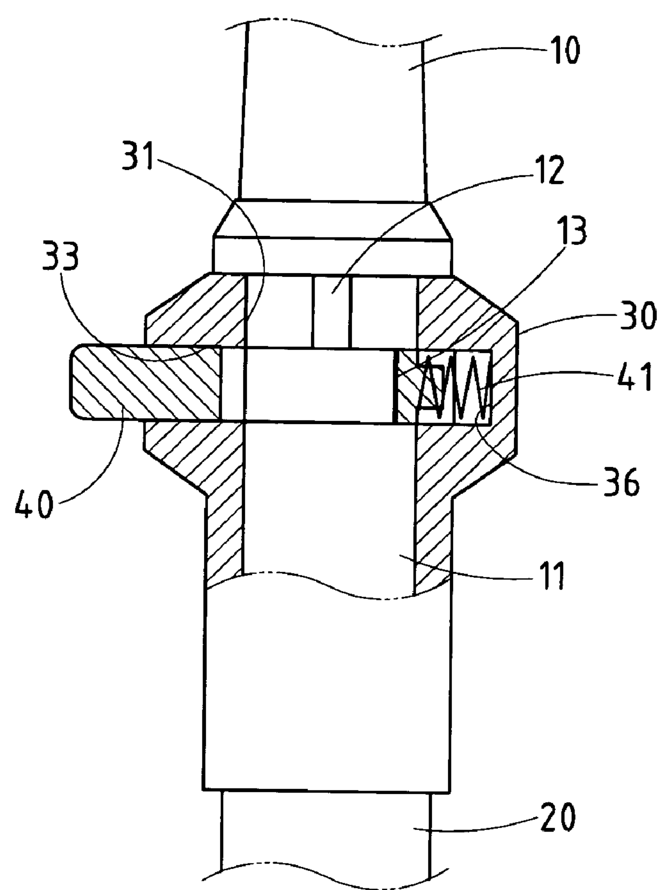
FIG. 3 shows a longitudinal sectional view of the first preferred embodiment of the present invention in the fastening state.
Figure 4:
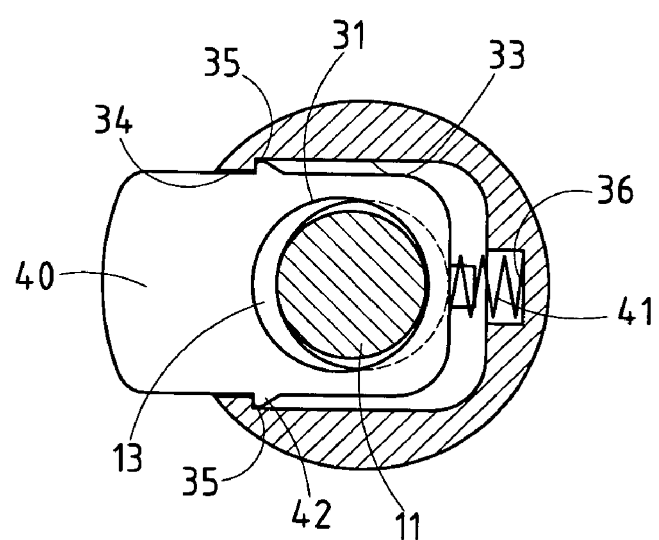
FIG. 4 shows a cross-sectional view of the present invention as shown in FIG. 3.

As illustrated in FIGS. 3 and 4, the blade 10 is fastened with the handle 20 in such a manner that the fastening end 11 of the blade 10 is inserted into the fastening end of the handle 20 via the retaining slot 31 of the fixation seat 30 and the retaining through hole 43 of the slide block 40, and that the deviation groove 13 of the blade 10 is engaged with the retaining through hole 43 of the slide block 40 by virtue of the retaining through hole 43 of the slide block 40 being eccentric with the retaining slot 31 of the fixation seat 30.

Figure 5:
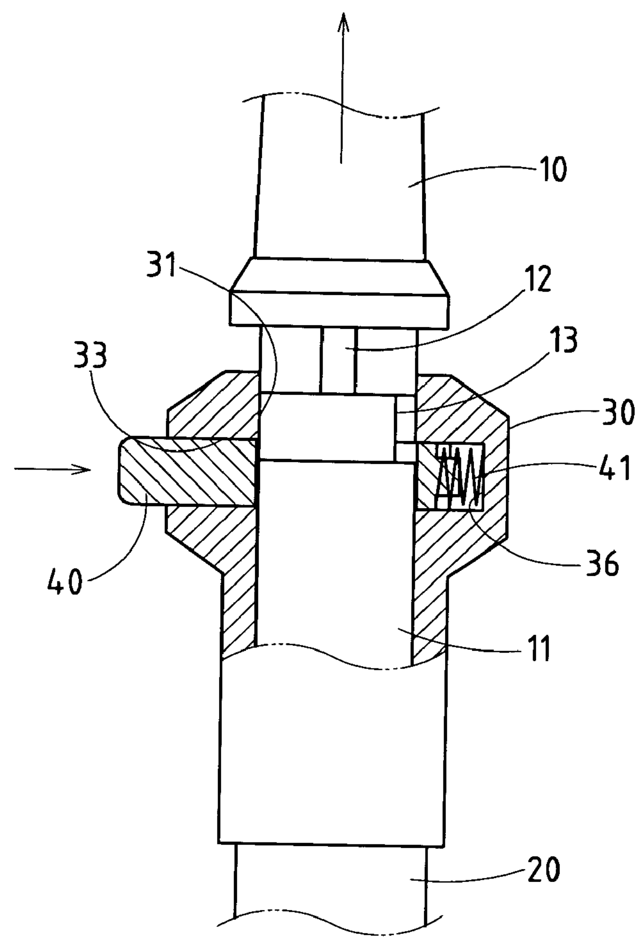
FIG. 5 shows a longitudinal sectional view of the first preferred embodiment of the present invention in the unfastening state.
Figure 6:
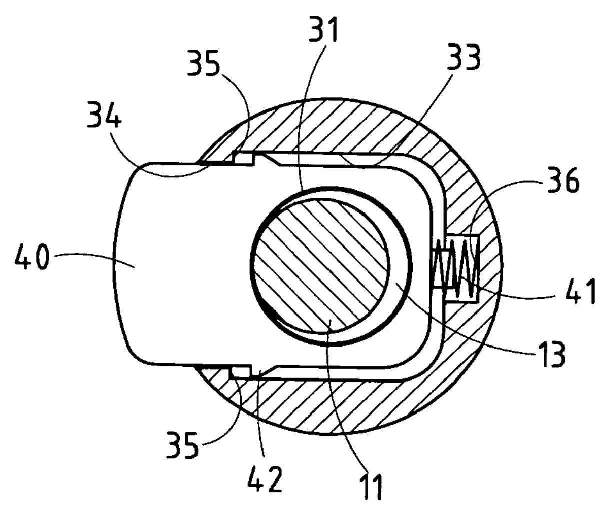
FIG. 6 shows a cross-sectional view of the first preferred embodiment of the present invention as shown in FIG. 5.

As illustrated in FIGS. 5 and 6, when the recovery spring 41 is compressed by the slide block 40 which is caused by an external force to slide further into the sliding slot 33 such that the retaining through hole 43 of the slide block 40 is concentric with the retaining slot 31 of the fixation seat 30, the deviation groove 13 of the blade 10 becomes disengaged with the retaining through hole 43 of the slide block 40, thereby enabling the blade 10 to be separated from the handle 20.

Figure 7:
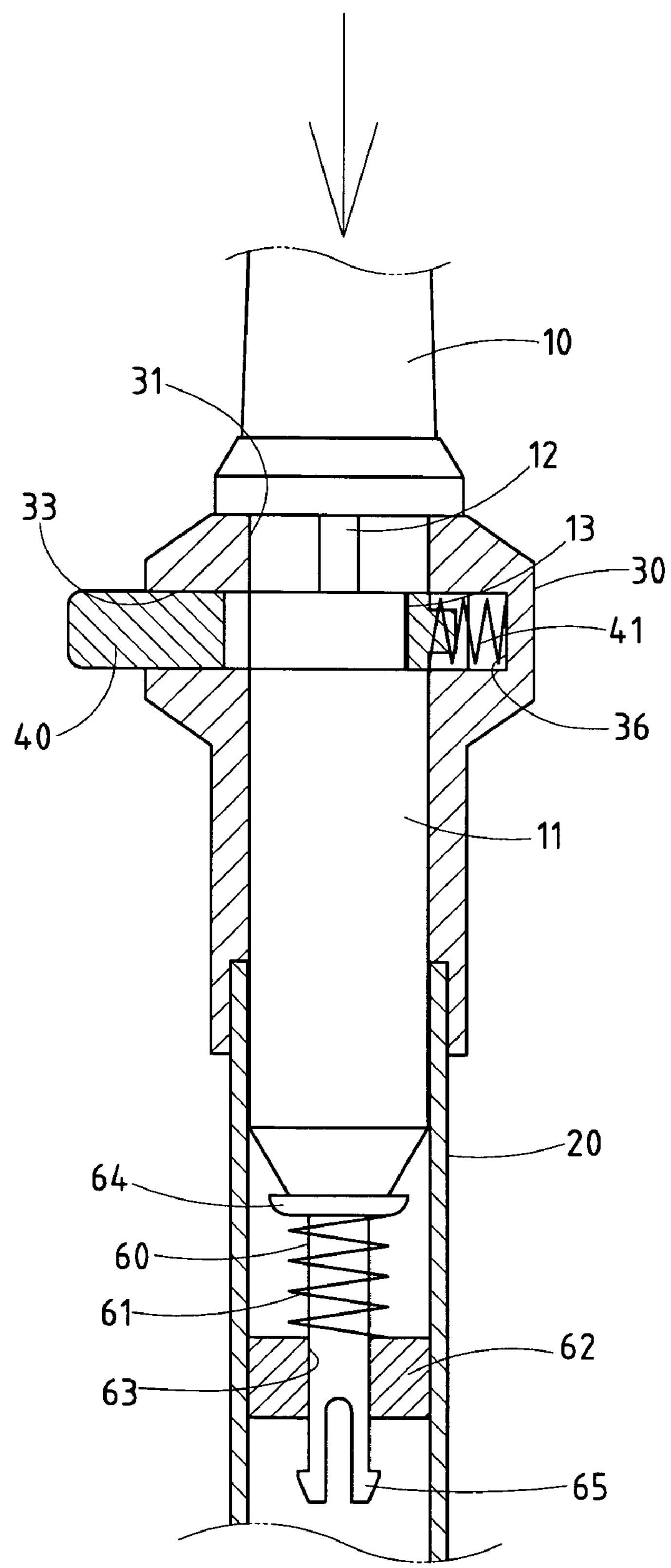
FIG. 7 shows a longitudinal sectional view of a second preferred embodiment of the present invention in the fastening state.

As shown in FIG. 7, the fastening end of the handle 20 is provided in a hollow interior with an elastic urging member which is formed of a rod 60, a recovery spring 61, and a fixation block 62 provided with a center through hole 63 and located fixedly in the hollow interior of the fastening end of the handle 20. The rod 60 is provided at a top end with a contact portion 64, and at a bottom end with an elastic inverted hooked portion 65 which is put through the center through hole 63 of the fixation block 62 to prevent the separation of the rod 60 from the fixation block 62. The recovery spring 61 is fitted over the rod 60 such that one end of the recovery spring 61 urges the contact portion 64 of the top end of the rod 60, and that other end of the recovery spring 61 urges the fixation block 62.

Figure 8:
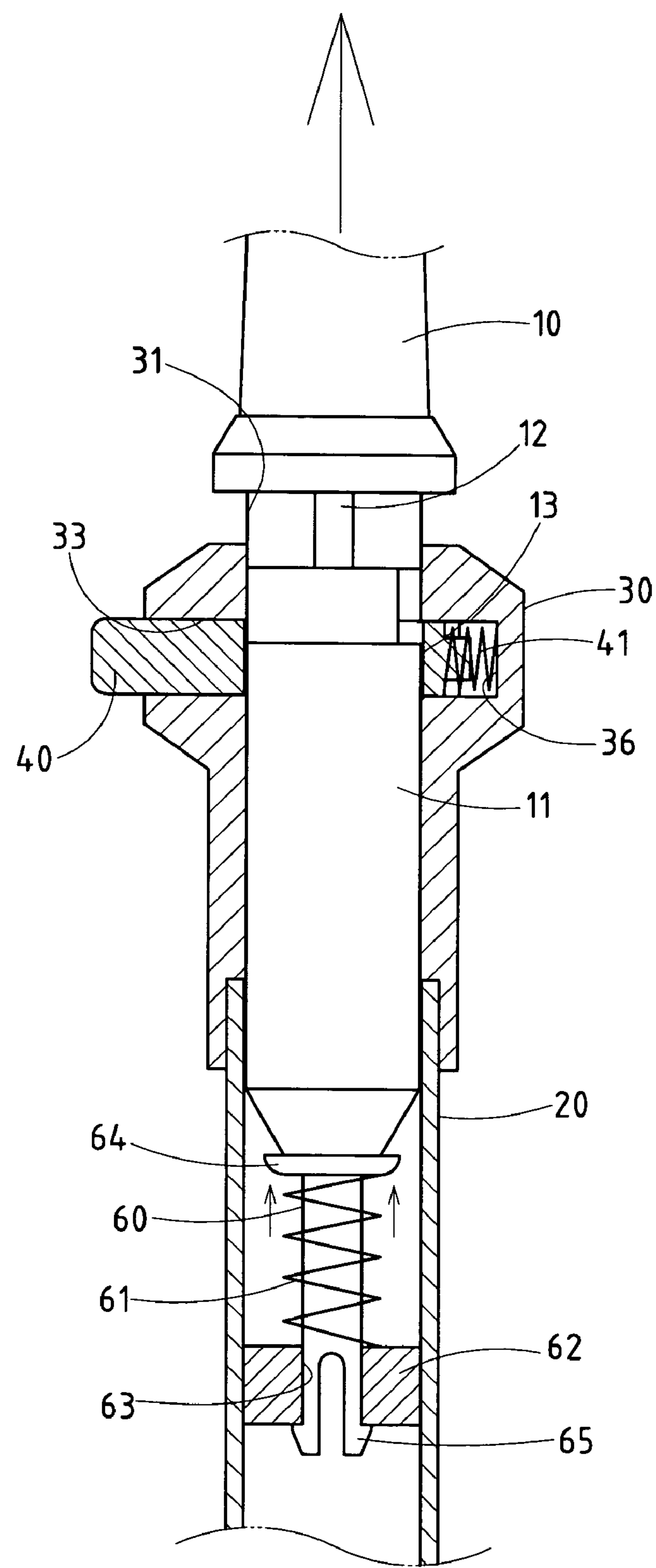
FIG. 8 shows a longitudinal sectional view of the second preferred embodiment of the present invention in the unfastening state.
Figure 9:
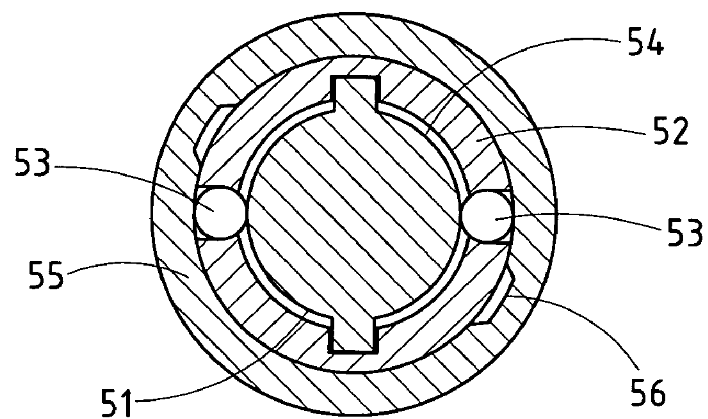
FIG. 9 shows a cross-sectional view of a prior art fastening structure of the gardening implements in the fastening state.
Figure 10:
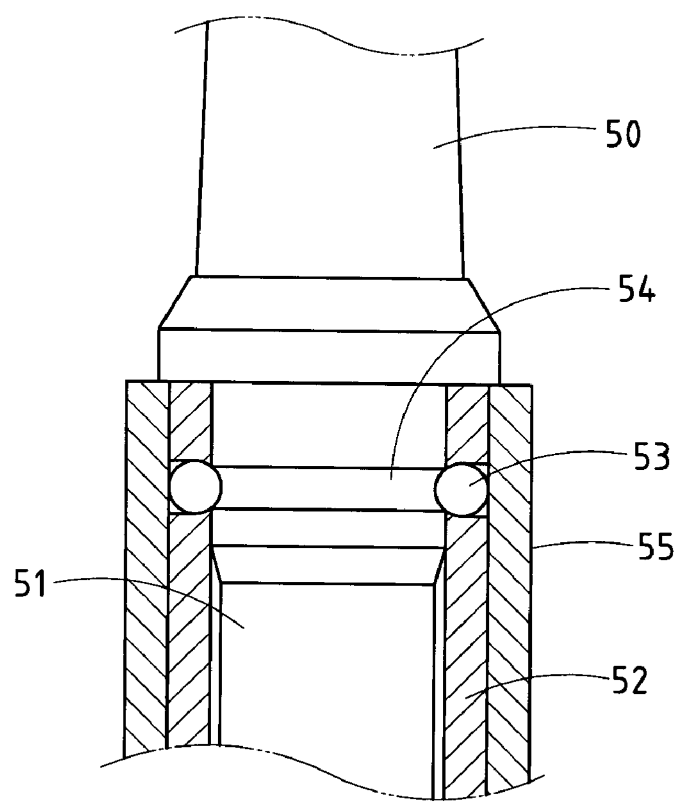
FIG. 10 shows a longitudinal sectional view of the prior art fastening structure as shown in FIG. 9.
Figure 11:
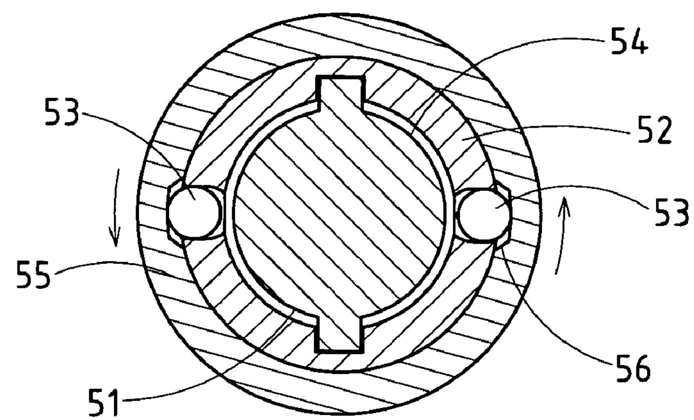
FIG. 11 shows a cross-sectional view of the prior art fastening structure of the gardening implements in the unfastening state.
Figure 12:
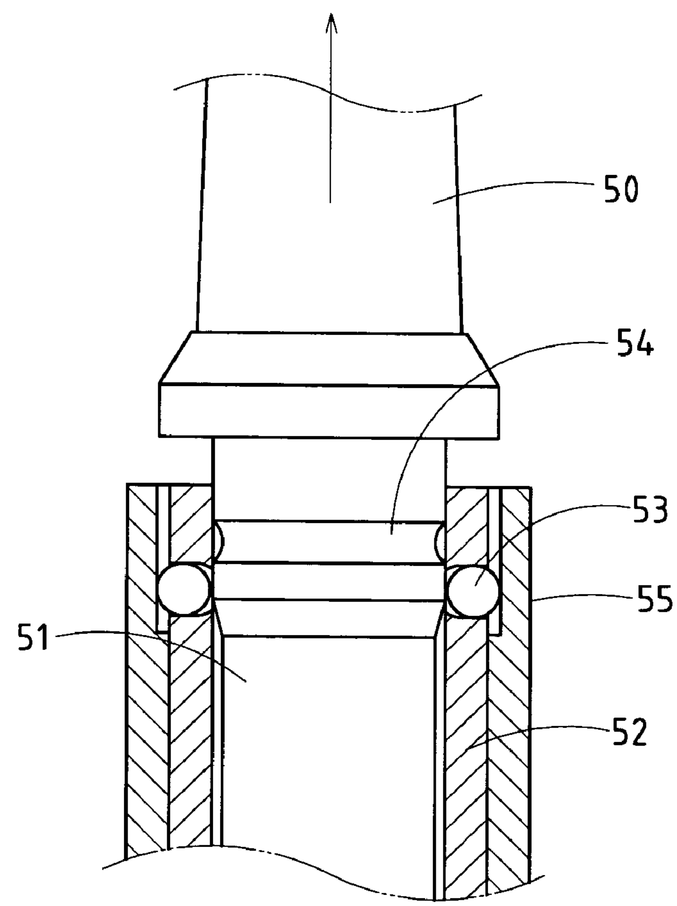
FIG. 12 shows a longitudinal sectional view of the prior art fastening structure as shown in FIG. 11.

When the blade 10 is fastened with the handle 20, the fastening end 11 of the blade 10 presses against the contact portion 64 of the rod 60, thereby resulting in compression of the recovery spring 61. As the slide block 40 is activated to enable the blade 10 to be separated from the handle 20, the fastening end 11 of the blade 10 is pushed by the spring force of the recovery spring 61 so as to enable the fastening end 11 of the blade 10 to be pulled out of the fastening end of the handle 20 with ease. In another words, the elastic urging member of the fastening end of the handle 20 is intended to provide the fastening end 11 of the blade 10 with a push by means of which the blade 10 can be easily separated from the handle 20, as illustrated in FIG. 8.

The embodiments of the present invention described above are merely illustrative and nonrestrictive. Accordingly, the present invention may be embodied in other specific forms without deviating from the spirit thereof. The present invention is therefore to be limited only by the scopes of the following claims.

I claim:

1. A gardening implement comprising:

a blade having a fastening end;

a handle having a fastening end with a hollow interior; and a fastening structure for fastening detachably said fastening end of said blade with said fastening end of said handle;

wherein said fastening structure comprises:

a deviation groove located in an outer wall of said fastening end of said blade;

a fixation seat fastened with a free end of said fastening end of said handle and provided with a retaining slot extending along a longitudinal direction of said handle such that said retaining slot is in communication with said hollow interior of said fastening end of said handle, said fixation seat further provided with a sliding slot extending in a direction perpendicular to the longitudinal direction of said handle such that said sliding slot is in communication with said retaining slot whereby said sliding slot is provided in two inner side walls with a stop recess; and a slide block provided with a retaining through hole and two stop edges corresponding in location to said two stop recesses of said sliding slot whereby said slide block is slidably disposed in said sliding slot of said fixation seat along with a spring in such a way that said retaining through hole of said slide block is corresponding in location to said retaining slot of said fixation seat, and that an inner end of said slide block is urged by one end of said spring, with other end of said spring urging an inner wall of one end of said sliding slot;

said fastening end of said blade being detachably fastened with said fastening end of said handle in such a manner that said fastening end of said blade is inserted into the hollow interior of said fastening end of said handle via said retaining slot of said fixation seat and said retaining through hole of said slide block, and that said deviation groove of said fastening end of said blade is engaged with said retaining through hole of said slide block, with said retaining through hole of said slide block being eccentric with said retaining slot of said fixation seat whereby said retaining through hole of said slide block and said retaining slot of said fixation seat become concentric at the time when said slide block is caused by an external force to slide to press against said spring, thereby resulting in disengagement of said deviation groove of said fastening end of said blade with said retaining through hole of said slide block, so as to enable said blade to be separated from said handle.

2. The gardening implement as defined in claim 1, wherein said hollow interior of said fastening end of said handle is provided with a fixation block which is provided with a center through hole and is located fixedly in said hollow interior, and a rod provided at a top end with a contact portion and at a bottom end with an elastic inverted hooked portion, said rod being movably held by said fixation block along with a recovery spring fitted over said rod in such a way that said elastic inverted hooked portion of said rod is put through said center through hole of said fixation block, and that one end of said recovery spring urges said contact portion of the top end of said rod, and that other end of said recovery spring urges said fixation block, said recovery spring being compressed by a force exerting on said contact portion of said rod by said fastening end of said blade at the time when said blade is fastened with said handle whereby said compressed recovery spring serves to provide said fastening end of said blade with a spring force to push said fastening end of said blade out of said fastening end of said handle at such time when said deviation groove of said fastening end of said blade becomes disengaged with said retaining through hole of said slide block.

* * * * *